June 15, 1943.  W. R. COCKBURN  2,321,995
DEVICE FOR THE CONTROL OF INFLATABLE
MEMBRANES IN MILKING MACHINES
Filed Jan. 3, 1942
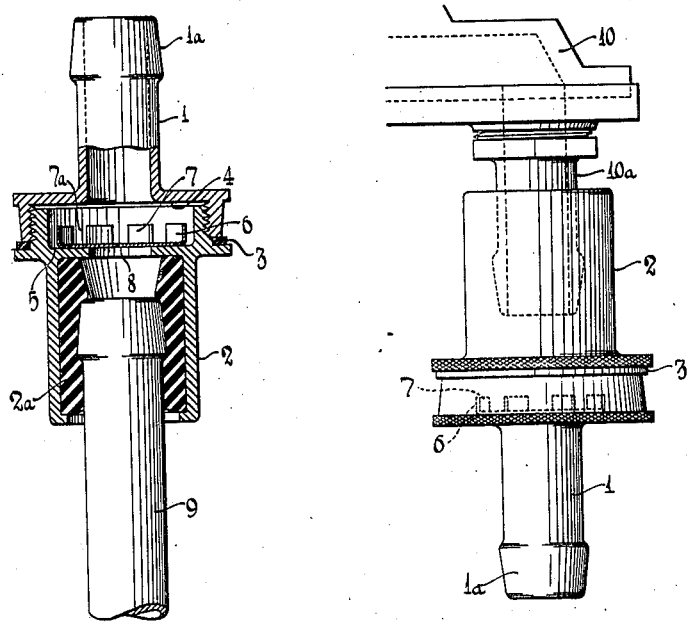
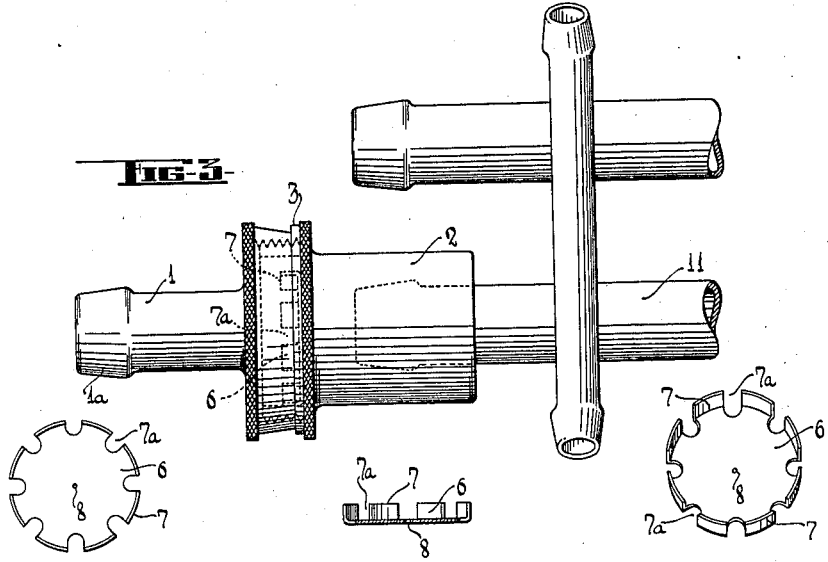
Inventor
W. R. Cockburn
By C. F. Wenderoth
Atty Patented June 15, 1943

2,321,995

UNITED STATES PATENT OFFICE 2,321,995

DEVICE FOR THE CONTROL OF INFLATABLE MEMBRANES IN MILKING MACHINES

William Reginald Cockburn, Onetangi, Waiheke Island, Auckland, New Zealand

Application January 3, 1942, Serial No. 425,562
In New Zealand June 3, 1940

1 Claim. (Cl. 31—86)

The invention relates to milking machines, and particularly to the parts thereof such as teat cup inflations and membranes of vacuum break devices, adapted to be operated by alternations of vacuum and atmosphere.

In the operation of such parts it is the practice to admit atmosphere direct and without restraint to previously evacuated or partially evacuated areas adjacent the member to be operated, with the result that the destruction or breaking down of the vacuum or partial vacuum, which was responsible for movement of the member in one direction, occurs suddenly or abruptly, and only at the beginning of the atmosphere admission phase, and so that reverse movement of the member is confined to a sudden or shock action also only at the commencement of the atmosphere admission phase, during the remainder of which, or until the vacuum phase is reinstituted, there is no action by said member.

Repeated operation of flexible members such as teat cup inflations, and membranes of vacuum break devices, under such "shock action" conditions, in course of time impairs the stability of same, and results in loss of efficiency of the flexible member, with the added disadvantage in the case of teat cup inflations, of causing the latter to fail to simulate a natural milking action on the teats of the animal being milked, and on the contrary by such "shock action" tending largely to retard the desired flow of milk from the teats, besides which the shocks are transmitted to the latter and are liable to irritate and set up undesired conditions in the animal.

The object of the invention is therefore to provide for the operation of flexible members of milking machines, adapted to function under alternations of vacuum and atmosphere, so that while said members operate freely and without restraint under vacuum, reversal of same suddenly, or under "shock conditions" is avoided, thereby enabling them to retain their efficiency over longer periods than heretofore, besides enabling a more natural milking action to be obtained.

Broadly, the invention consists in providing for the operation of parts of milking machines, placed under vacuum alternately with being opened to atmosphere, by subjecting said parts to the action of vacuum, and then destroying the latter by atmosphere admitted or applied with a positive and gradually increasing pressure, so that said parts operate freely and abruptly under vacuum and gradually under atmosphere.

By controlling the admission or application of atmosphere to the flexible membranes, as aforesaid, the instantaneous thudding collapse or sudden contraction of inflations on teats (miscalled the squeeze) is avoided, and instead the impact of atmosphere-into-vacuum is diffused, so that the atmosphere applies its force to the inflation over the entire duration of the atmosphere admission phase, with a gradually increasing pressure, without interfering with the vacuum or suction phase, the action of which as the result of the regulated action of the atmosphere, is by contrast intensified.

Means for enabling the before described operation to be carried out, can comprise a housing adapted for insertion in a pulsation line between a pulsator and a part to be operated; a valve in said housing adapted to open freely under vacuum, and to occupy a closed position under atmosphere; and a restricted by-pass for the latter when said valve is in the closed position.

The carrying out of the invention will however be more particularly described with the aid of the accompanying drawing in which:

Figure 1 is a cross section of a complete device suitable for carrying out the invention, fitted to the upper end of a dropper tube, of a milking machine;

Figure 2 an elevation of the device reversed and fitted to a pulsator nipple offset;

Figure 3 a plan view of the device fitted to a pulsation offset of a teat cup's claw;

Figure 4 a plan view of the valve used in the device;

Figure 5 a cross sectional view thereof, and

Figure 6 a perspective view of said valve.

The housing of the devices comprise a male portion 1, with nipple 1a, and a female portion 2 designed to screw or to be otherwise secured together, with a gasket 3 between them to ensure an air tight joint being made.

The portions 1 and 2 are formed with opposed seatings 4 and 5 therein, and between which a valve 6 is located, and is adapted to operate under alternations of vacuum and atmosphere, said valve 6 being of hollow or crown formation with openings 7a in its rim 7, and also containing an aperture or by-pass 8 in its body or main portion.

The portion 2 of the housing is fitted internally with a moulded rubber gland block or packing 2a to engage and retain an inserted nipple or the like therein, in an airtight manner.

The housing when assembled can be used as a connector anywhere in a pulsation line between the pulsator and the part or member to be operated by the alternations of vacuum and atmosphere, and the valve 6 which is reversible at will, is always used with its hollow side towards the source of vacuum and atmosphere alternations.

Thus in Figure 1 where the housing is shown fitted to a dropper 9 connected with a teat cup's claw, the hollow side of the valve 6 is presented to the nipple 1a which in use would be in communication with the pulsator, and in Figure 2 where the housing is shown fitted to a pulsator 10 by the portion 2 being passed upon the nipple 10a thereof, the valve 6 is reversed so that its hollow side is presented to the pulsator 10.

In Figure 3 the position of the valve 6 remains the same as in Figure 1, the hollow side of the valve being presented to the nipple 1a which is placed in communication with the pulsator, the portion 2 of the housing being connected with the pulsation space of a teat cup's claw 11.

It will be seen therefore that atmosphere at velocity entering the housing from the pulsator, encounters the hollow side of the valve 6 and drives the latter hard against whichever seating 4 or 5 is furthest from the source of the alternations, and owing to the back or the non-rimmed surface of the valve 6 engaging the seating, the openings 7a, in the rim 7 of the valve 6, are not available for the passage of atmosphere through the housing, and said atmosphere can only pass through the latter slowly according to the area of the aperture or by-pass 8, thereby ensuring gradual or slow movement of the part operated by the alternations of vacuum and atmosphere, as distinguished from the sharp or snappy movement of said part, when acted upon by the vacuum.

Thus in the case of teat cup inflations, it is ensured, that the latter collapse or contract around or upon the teats of an animal being milked with an action, which is slow or gradual compared with the sharp or sudden release of the teats by said inflations, when the exteriors thereof are under vacuum, and the duration of the collapsing or contraction of the inflations can be made to extend over the full period of the atmosphere admission phase, by regulating the size of the aperture or by-pass 8.

A further feature is that owing to the slow or gradual passage of atmosphere through the housing, the pressure on the part or member operated by the alternations of vacuum and atmosphere, is caused to increase during the atmosphere admission phase.

When the valve 6 is placed under vacuum its rim 7 engages the seating nearest the source of the alternations, leaving the way through the housing open via the openings 7a and the aperture or by-pass 8, the combined areas of which are such, as to permit the vacuum to act as desired on the part being operated, also the effect of the vacuum on the latter can be varied by placing the housing with the valve 6 therein, close to or further away from said part.

Instead of forming the housing with a portion 2, adapted to receive a nipple or pipe end, said portion 2 can be given the form of a nipple similar to the nipple 1a so that the housing will be provided with two nipples to enable it to be inserted in a rubber pipe line, or to serve as a union or connector between two ends of rubber tubing or the like.

The invention can also be used in the operation of pulsating or "spitting" releasers, to give a slow opening movement of the milk outlet valve and avoid splashing of milk.

I claim:

A device for the control of inflatable membranes in milking machines comprising a housing for insertion in a pulsation line between a pulsator and a part to be operated, spaced opposed valve seatings in said housing, a crown shaped valve movable between said seatings under the action of alternate vacuum and atmospheric pulsations in said line, the rim upon said valve having openings therein to permit free application of vacuum while the top of said valve has a restricted by-pass therein so that when said valve is in closed position under the influence of atmospheric pressure said atmospheric pressure is applied gradually to said part to be operated.

WILLIAM REGINALD COCKBURN.